US012613718B2

(12) United States Patent
Zeng et al.

(10) Patent No.: US 12,613,718 B2
(45) Date of Patent: Apr. 28, 2026

(54) INFORMATION PROCESSING METHODS AND APPARATUS, ELECTRONIC DEVICES, AND STORAGE MEDIA

(71) Applicant: Beijing Feishu Technology Co., Ltd., Beijing (CN)

(72) Inventors: Yihui Zeng, Beijing (CN); Juncong Li, Beijing (CN); Xinlei Guo, Beijing (CN); Ronghui Zhang, Beijing (CN); Shijie Liu, Beijing (CN); Qiansong Xu, Beijing (CN); Di Zhou, Beijing (CN)

(73) Assignee: BEIJING FEISHU TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/762,169

(22) Filed: Jul. 2, 2024

(65) Prior Publication Data

US 2024/0354129 A1 Oct. 24, 2024

Related U.S. Application Data

(63) Continuation of application No. PCT/CN2023/072489, filed on Jan. 17, 2023.

(30) Foreign Application Priority Data

Jan. 19, 2022 (CN) .......................... 202210060638.9

(51) Int. Cl.
*G06F 9/451* (2018.01)
*G06F 16/2455* (2019.01)
(Continued)

(52) U.S. Cl.
CPC ........ *G06F 9/451* (2018.02); *G06F 16/24565* (2019.01); *G06N 20/00* (2019.01); *G06Q 10/1097* (2013.01)

(58) Field of Classification Search
CPC ...... G06F 9/453; G06F 40/186; G06F 9/4831; G06F 9/4843; G06F 3/167; G06F 40/205;
(Continued)

(56) References Cited

U.S. PATENT DOCUMENTS 10,146,394 B2 * 12/2018 Ryall ..................... H04L 65/403
10,949,448 B1 * 3/2021 Sar ..................... G06F 16/24565
(Continued)

FOREIGN PATENT DOCUMENTS

AU 2003282670 B2 * 10/2009 ........... G06Q 10/107
AU 2014227586 A1 * 9/2015 ............. G06F 40/58
(Continued)

OTHER PUBLICATIONS

International Search Report and Written Opinion received for PCT Patent Application No. PCT/CN2023/072489, mailed on Apr. 19, 2023, 12 pages (5 pages of English Translation and 7 pages of Original Document).
(Continued)

*Primary Examiner* — Steven P Sax
(74) *Attorney, Agent, or Firm* — Astute IP Law Group

(57) ABSTRACT

The present disclosure provides an image processing method, including: displaying a first task information entry and a user control of a second user associated with the first task information entry on a task interface of a first user; obtaining at least one second task information entry of the second user in response to a preset operation on the user control; displaying a task sub-interface of the second user on the task interface of the first user; and displaying the at least one second task information entry on the task sub-interface of the second user based on a correlation between the at least one second task information entry and the first task information entry.

18 Claims, 6 Drawing Sheets

(51) Int. Cl.
  *G06N 20/00*    (2019.01)
  *G06Q 10/109*   (2023.01)

(58) Field of Classification Search
  CPC .. G06F 21/554; G06F 16/284; G06F 3/04883;
     G06F 3/0482; G06F 3/0488; G06F 9/542;
     G06F 9/451; G06F 16/24565; G06Q
     10/10; G06Q 10/0633; G06Q 10/00;
     G06Q 10/02; G06Q 10/101; G06Q
     10/1097; G10L 15/22; G09G 2380/08;
             G06N 20/00
  See application file for complete search history.

(56)      References Cited

U.S. PATENT DOCUMENTS

| | | | | |
|---|---|---|---|---|
| 11,315,079 | B2 * | 4/2022 | Miller | G06Q 10/101 |
| 11,328,234 | B2 * | 5/2022 | Schmidt | G06Q 10/063114 |
| 11,868,936 | B2 * | 1/2024 | Dahn | G06F 40/186 |
| 2020/0175479 | A1 * | 6/2020 | Kozlovski | G06F 3/04883 |
| 2022/0230714 | A1 * | 7/2022 | Batman | G16H 40/67 |

FOREIGN PATENT DOCUMENTS

| | | | | | |
|---|---|---|---|---|---|
| CA | 2996314 | A1 | * | 12/2015 | G06Q 10/10 |
| CN | 103210405 | A | * | 7/2013 | G06Q 10/10 |
| CN | 111353686 | A | | 6/2020 | |
| CN | 111414543 | A | | 7/2020 | |
| CN | 111857508 | A | | 10/2020 | |
| CN | 113741755 | A | | 12/2021 | |
| CN | 113741756 | A | | 12/2021 | |
| CN | 114416256 | A | | 4/2022 | |
| CN | 114683268 | A | * | 7/2022 | |
| CN | 117130744 | A | * | 11/2023 | G06F 3/16 |
| CN | 113656183 | B | * | 7/2024 | G06F 16/27 |
| CN | 115129404 | B | * | 7/2024 | G06F 9/451 |
| CN | 112347387 | B | * | 12/2024 | G06F 16/9558 |
| TW | 200421152 | A | * | 10/2004 | A61B 5/0002 |
| TW | 201246009 | A | * | 11/2012 | G06F 3/04815 |
| WO | WO-2022066396 | A1 | * | 3/2022 | A61B 5/6803 |
| WO | WO-2023045896 | A1 | * | 3/2023 | G06Q 10/10 |

OTHER PUBLICATIONS

Notice to Grant received for Chinese Patent Application No. 202210060638.9, mailed on Apr. 15, 2023, 8 pages (4 pages of English Translation and 4 pages of Original Document).
Office Action received for Chinese Patent Application No. 202210060638.9, mailed on Aug. 9, 2022, 23 pages (9 pages of English Translation and 14 pages of Original Document).

* cited by examiner

Task of user A

Objective ************@user B

Sub-objective 1 ************@user C

Sub-objective 2 ************@user D

Sub-objective 3 ************@user E

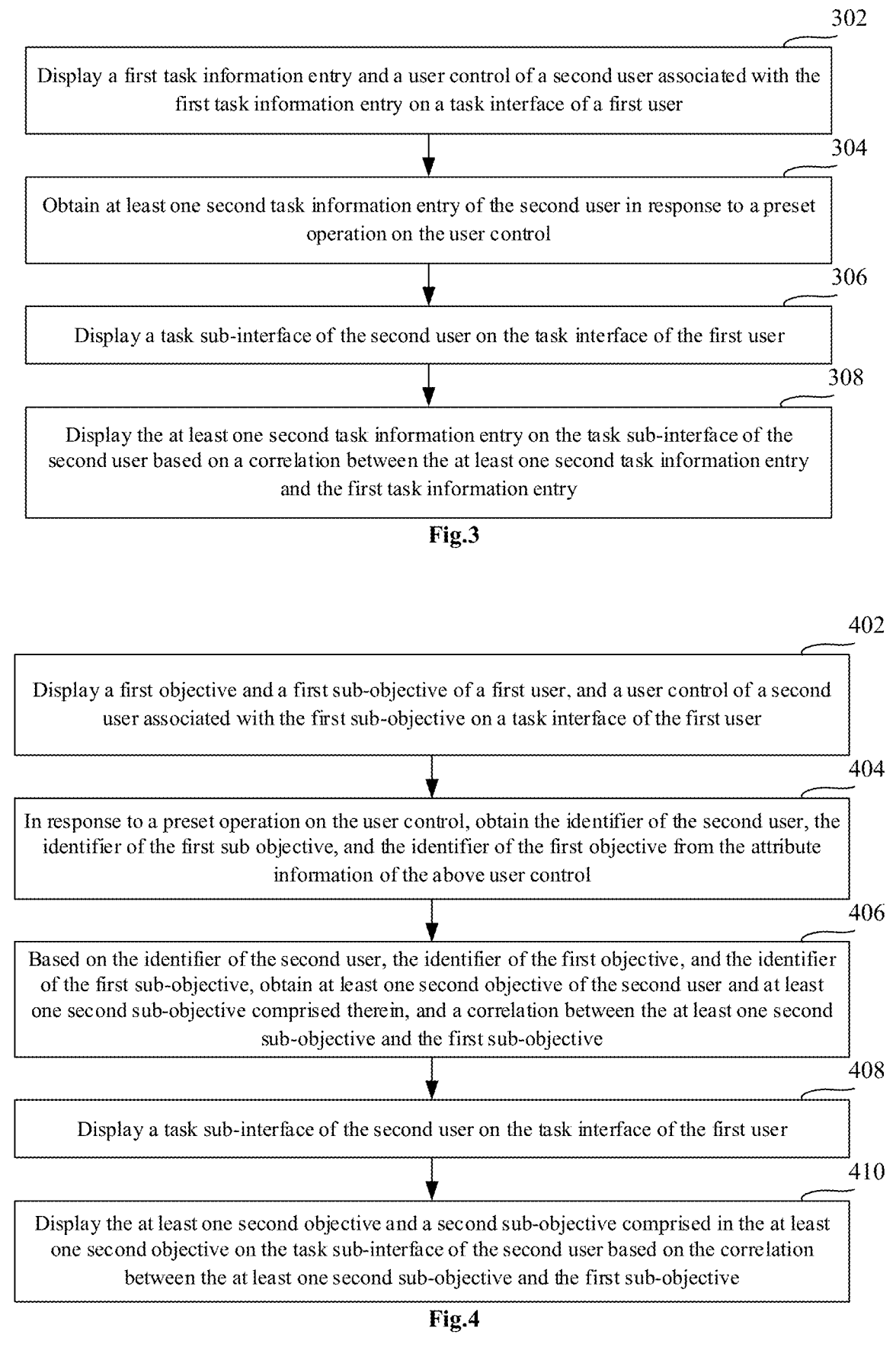

302

Display a first task information entry and a user control of a second user associated with the first task information entry on a task interface of a first user

304

Obtain at least one second task information entry of the second user in response to a preset operation on the user control

306

Display a task sub-interface of the second user on the task interface of the first user

308

Display the at least one second task information entry on the task sub-interface of the second user based on a correlation between the at least one second task information entry and the first task information entry

Display a first objective and a first sub-objective of a first user, and a user control of a second user associated with the first sub-objective on a task interface of the first user

404

In response to a preset operation on the user control, obtain the identifier of the second user, the identifier of the first sub objective, and the identifier of the first objective from the attribute information of the above user control

406

Based on the identifier of the second user, the identifier of the first objective, and the identifier of the first sub-objective, obtain at least one second objective of the second user and at least one second sub-objective comprised therein, and a correlation between the at least one second sub-objective and the first sub-objective

408

Display a task sub-interface of the second user on the task interface of the first user

410

Display the at least one second objective and a second sub-objective comprised in the at least one second objective on the task sub-interface of the second user based on the correlation between the at least one second sub-objective and the first sub-objective

Fig.4

Task of user A

Objective*********** @user B   502

Sub-objective 1 *********** @user C   504

Sub-objective 2 *********** @user D   506

Sub-objective 3 *********** @user E   508

Task of user A

Objective O1 ******** @user B

Sub-objective 1 ****** @user C

Sub-objective 2 ****** @user D

Sub-objective 3******

Task of user D

Objective O2 ***********

Sub-objective 2 ***********
Sub-objective 3 ***********

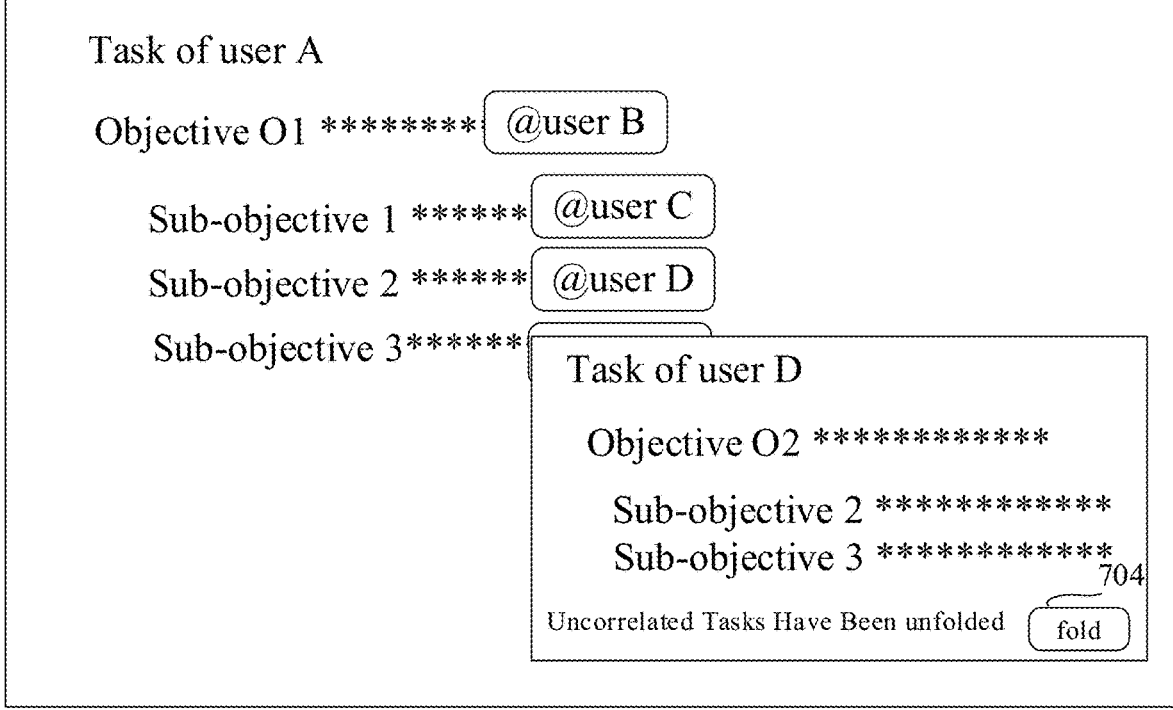

Task of user A

Objective O1 ******** @user B

Sub-objective 1 ****** @user C

Sub-objective 2 ****** @user D

Sub-objective 3******

Task of user D

Objective O2 ***********

Sub-objective 2 ***********

Sub-objective 3 ***********

702

Uncorrelated Tasks Have Been folded    Unfold

Fig.7a

Task of user A

Objective O1 ******** @user B

Sub-objective 1 ****** @user C

Sub-objective 2 ****** @user D

Sub-objective 3******

Task of user D

Objective O2 ***********

Sub-objective 2 ***********

Sub-objective 3 ***********

704

Uncorrelated Tasks Have Been unfolded    fold

Fig.7b

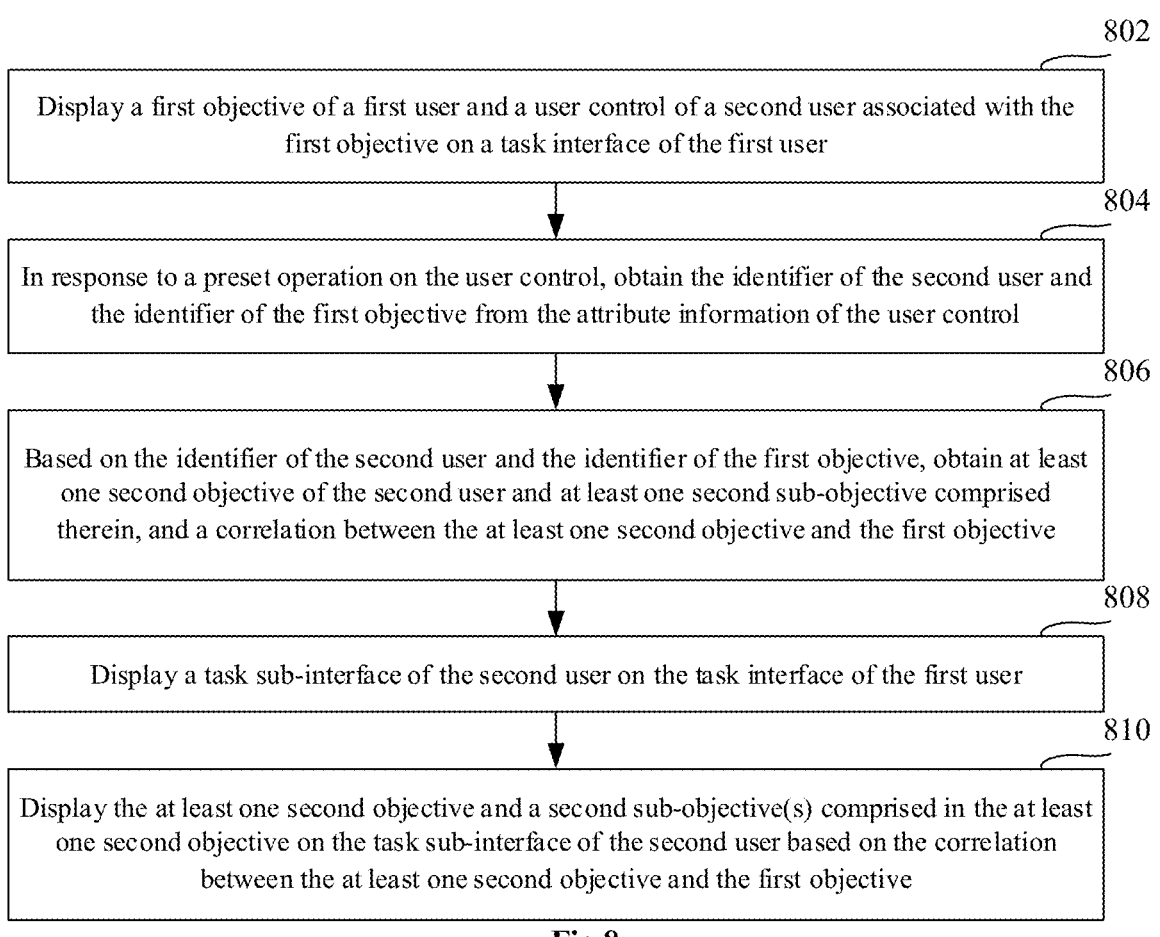

802

Display a first objective of a first user and a user control of a second user associated with the first objective on a task interface of the first user

804

In response to a preset operation on the user control, obtain the identifier of the second user and the identifier of the first objective from the attribute information of the user control

806

Based on the identifier of the second user and the identifier of the first objective, obtain at least one second objective of the second user and at least one second sub-objective comprised therein, and a correlation between the at least one second objective and the first objective

808

Display a task sub-interface of the second user on the task interface of the first user

810

Display the at least one second objective and a second sub-objective(s) comprised in the at least one second objective on the task sub-interface of the second user based on the correlation between the at least one second objective and the first objective

Fig.8

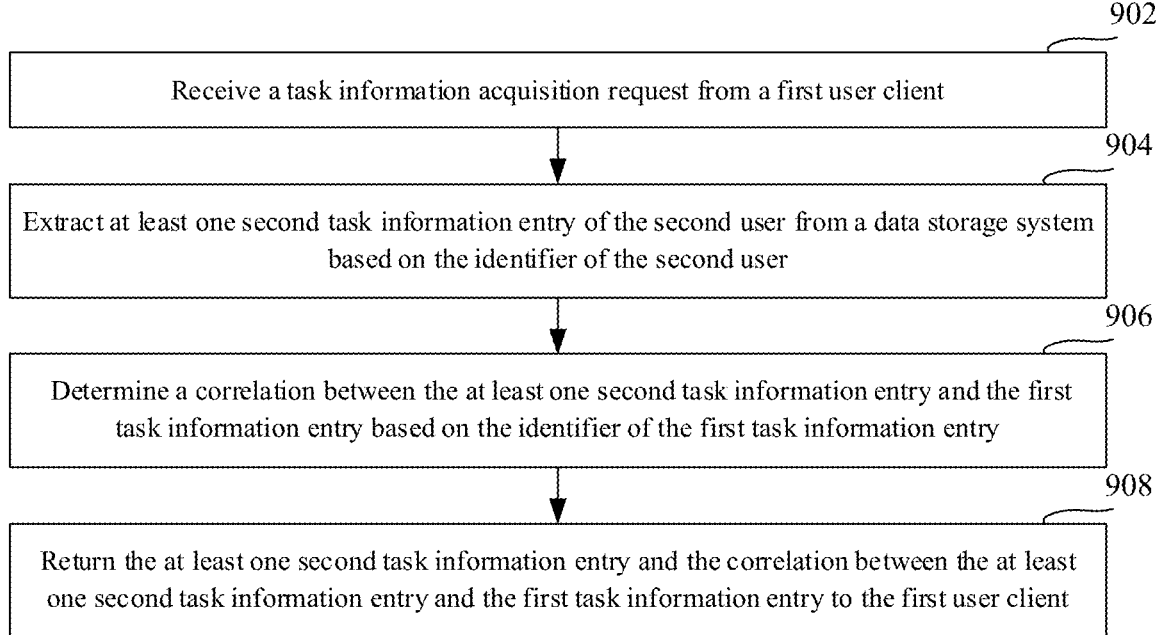

902

Receive a task information acquisition request from a first user client

904

Extract at least one second task information entry of the second user from a data storage system based on the identifier of the second user

906

Determine a correlation between the at least one second task information entry and the first task information entry based on the identifier of the first task information entry

908

Return the at least one second task information entry and the correlation between the at least one second task information entry and the first task information entry to the first user client

Fig.9

INFORMATION PROCESSING METHODS AND APPARATUS, ELECTRONIC DEVICES, AND STORAGE MEDIA

CROSS-REFERENCE TO RELATED APPLICATIONS

This application is a continuation application of PCT/CN2023/072489 filed Jan. 17, 2023, which claims priority to and is based on a Chinese application for invention 202210060638.9, filed on Jan. 19, 2022, the disclosures of which are hereby incorporated into this disclosure by reference in their entireties.

TECHNICAL FIELD

This disclosure relates to the field of computer technology, particularly to an information processing method and apparatus, an electronic device, and a storage medium.

BACKGROUND

As companies and organizations continue to evolve, their organizational structures can become larger and the division and management of tasks can become more complex. When dealing with a task partitioning issue for a team, after assigning specific tasks to specific operators or executors, a user typically need to keep track of the execution status of those operators or executors at all times.

SUMMARY

According to some embodiments of the present disclosure, there is provided an information processing method, comprising: displaying a first task information entry and a user control of a second user associated with the first task information entry on a task interface of a first user; obtaining at least one second task information entry of the second user in response to a preset operation on the user control; displaying a task sub-interface of the second user on the task interface of the first user; and displaying the at least one second task information entry on the task sub-interface of the second user based on a correlation between the at least one second task information entry and the first task information entry.

According to other embodiments of the present disclosure, there is provided an information processing method, comprising: receiving a task information acquisition request from a first user client; wherein an identifier of a second user and an identifier of a first task information entry are carried in the task information acquisition request; extracting at least one second task information entry of the second user from a data storage system based on the identifier of the second user; determining a correlation between the at least one second task information entry and the first task information entry based on the identifier of the first task information entry; and returning the at least one second task information entry and the correlation between the at least one second task: information entry and the first task information entry to the first user client.

According to further embodiments of the present disclosure, there is provided an information processing apparatus, comprising: a display module, an operation detection module, and a communication module; wherein: the display module is configured to display a first task information entry and a user control of a second user associated with the first task information entry on a task interface of a first user; the operation detection module is configured to detect a preset operation on the user control; the communication module is configured to obtain at least one second task information entry of the second user; the display module is further configured to display a task sub-interface of the second user on the task interface of the first user; and display the at least one second task information entry on the task sub-interface of the second user based on a correlation between the at least one second task information entry and the first task information entry.

According to further embodiments of the present disclosure, there is provided an information processing apparatus, comprising: a communication module, an information extraction module, and a correlation determination module, wherein: the communication module is configured to receive a task information acquisition request from a first user client; wherein an identifier of a second user and an identifier of a first task information entry are carried in the task information acquisition request; the information extraction module is configured to extract at least one second task information entry of the second user from a data storage system based on the identifier of the second user; the correlation determination module is configured to determine a correlation between the at least one second task information entry and the first task information entry based on the identifier of the first task information entry; the communication module is further configured to return the at least one second task information entry and the correlation between the at least one second task information entry and the first task information entry to the first user client.

According to further embodiments of the present disclosure, there is further provided an electronic device comprising a memory, a processor, and a computer program stored in the memory and executable by the processor, wherein the processor, when executing the computer program, performs the information processing method according to any embodiment of the present disclosure.

According to further embodiments of the present disclosure, there is further provided a non-transitory computer-readable storage medium storing computer instructions, wherein the computer instructions when executed by a computer, cause the computer to perform the information processing method according to any embodiment of the present disclosure.

BRIEF DESCRIPTION OF THE DRAWINGS

In order to more clearly explain embodiments of the present disclosure or a technical solution in the prior art, a brief introduction will be given below for the drawings required to be used in the description of the embodiments or the prior art. It is obvious that, the drawings illustrated as follows are merely some embodiments of the present disclosure. For a person skilled in the art, he or she may also acquire other drawings according to such drawings on the premise that no inventive effort is involved.

FIG. 3 is a flowchart of an information processing method provided by some embodiments of the present disclosure;

FIG. 4 is a flowchart of an information processing method in a task management system provided by some embodiments of the present disclosure;

FIG. 7*a* shows a schematic diagram of a task management interface displayed by a task management client when a user moves a mouse cursor to a user control of user D shown in FIG. 5 in an embodiment of the present disclosure;

FIG. 7*b* shows a schematic diagram of a task management interface displayed by a task management client when an unfold control shown in FIG. 7*a* is clicked in some embodiments of the present disclosure;

FIG. 8 is a flowchart of an information processing method in a task management system provided by some embodiments of the present disclosure;

FIG. 9 is a flowchart of an information processing method performed by a task management server provided by some embodiments of the present disclosure;

DETAILED DESCRIPTION

For a clear understanding of the object of the present disclosure, its technical solution and advantages, the present disclosure will be further described in detail below in conjunction with the accompanying drawings and embodiments.

Note that unless defined otherwise, all technical and scientific terms used in the present disclosure have the same meaning as commonly understood by one of ordinary skill in the art to which the embodiments of the present disclosure belong. The use of the terms "first", "second" or the like in the present disclosure does not denote any order, quantity or importance, but are merely used to distinguish between different components. The terms "comprise", "comprise" and the like mean that the elements or objects preceding the term cover the elements or objects listed after the term and their equivalents, without excluding other elements or objects. The terms "connect", "connecting" and the like are not limited to physical or mechanical connections, but may comprise electrical connections, regardless of whether the connections are direct or indirect connections. The terms "up", "down", "left", "right" or the like are used only to represent a relative positional relationship, and the relative positional relationship may be changed if the absolute position of the described object changes.

As mentioned above, as companies and organizations continue to evolve, their organizational structures can become larger and the division and management of tasks can become more complex. Currently, many organizations choose to use dedicated task management systems to assign and manage tasks. How to process and display task information in these task management systems is a problem that needs to be solved.

Figures 1, 2:
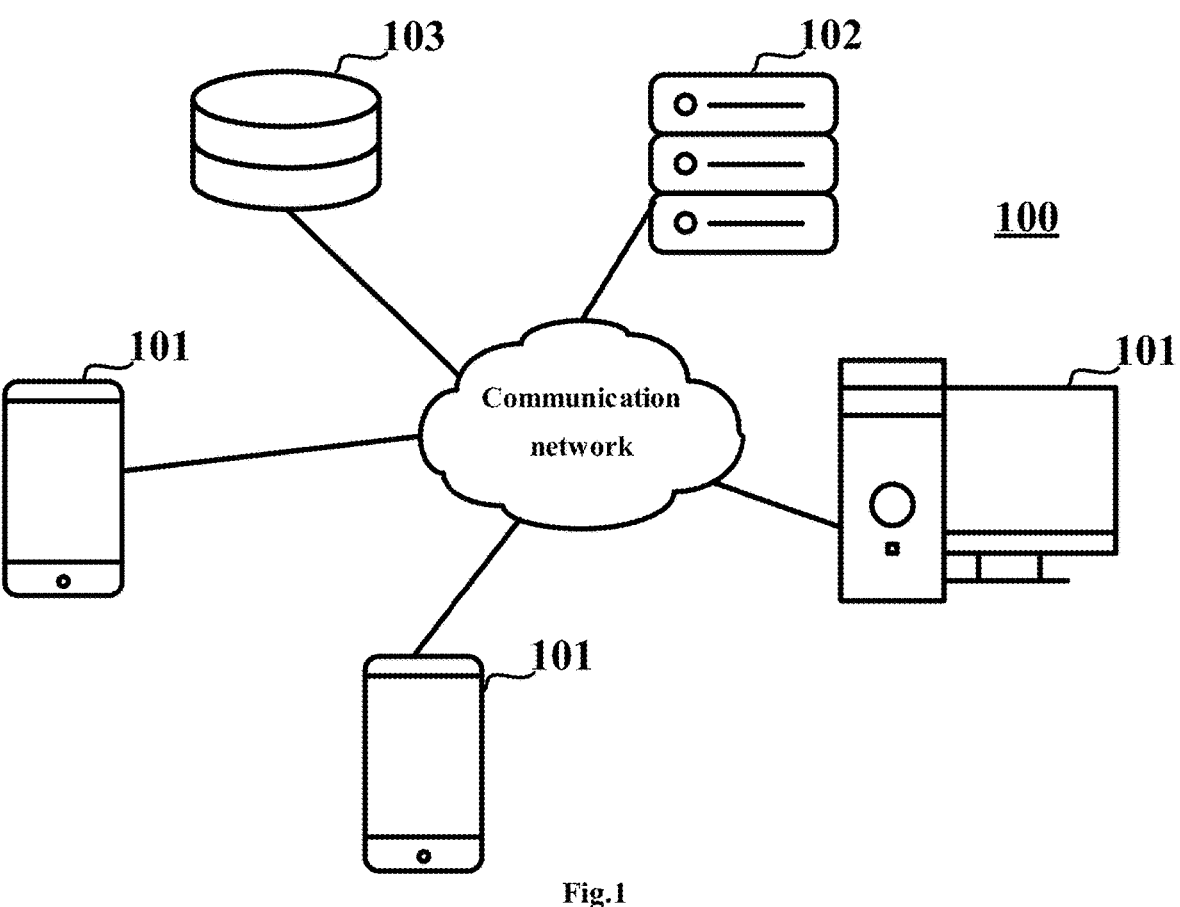
FIG. 1 is a schematic diagram showing an application scenario of an information processing method provided by some embodiments of the present disclosure.
FIG. 2 is a schematic diagram of a task management interface of user A displayed in a task management client provided by some embodiments of the present disclosure.

In view of this, some embodiments of the present disclosure provide an information processing method. FIG. 1 is a schematic diagram showing an application scenario of an information processing method provided by some embodiments of the present disclosure. This application scenario comprises a terminal device 101, a task management server 102, and a data storage system 103. The terminal device 101, the task management server 102, and the data storage system 103 in FIG. 1 can also form a task management system 100 for task management and provide a user with various task management services.

The terminal device 101, the task management server 102, and the data storage system 103 can all be connected via a wired or wireless communication network. The terminal device 101 comprises but is not limited to a desktop computer, a mobile phone, a mobile computer, a tablet, a media player, a smart wearable device, a personal digital assistant (PDA), or other electronic devices that can achieve the above functions. The task management server 102 and the data storage system 103 can both be independent physical servers, server clusters composed of multiple physical servers, or distributed systems. They can also be cloud servers that provide basic cloud computing services such as cloud services, cloud databases, cloud computing, cloud functions, cloud storage, network services, cloud communication, middleware services, domain name services, security services, CDN, as well as big data and artificial intelligence platforms.

In some embodiments of the present disclosure, the task management server 102 is used to provide a task management service to a user of the terminal device 101.

The terminal device 101 is equipped with a task management client that communicates with the task management server 102. Through this task management client, a user can enter, edit, and publish his/her own task, associate his/her own task with a task of another user, and view his/her own task with the task of the another user. Generally, the user can enter, edit, publish, and view the above task through his/her own task interface. It should be noted that in some embodiments of the present disclosure, a user may reference another user when entering and editing his/her task, indicating that the task may be associated with the task of the referenced user. When the referenced user confirms the above association relationship, an association between the tasks is created.

The data storage system 103 can usually be used to store task information published by a user, association information between tasks, and so on. In other embodiments disclosed herein, the data storage system 103 may be used only for storing the task information published by the user, and the above association information between tasks may be stored in the task management server 102.

Specifically, in some task management systems, a task entered, edited, and published by a user may comprise an objective and at least one sub-objective corresponding to that objective.

In some embodiments of the present disclosure, when a user enters an objective or a sub-objective of a task, an ID of another user may also be entered to indicate that the objective or sub-objective in the task may have an association with a task of the other user. Then, during a task alignment process, if the referenced user can align an objective in his or her task with the referencing user's objective, an association is created between the two tasks. The association between the above tasks can be stored in the data storage system 103 or in the task management server 102. The above task management server 102 is mainly used to provide task management services to the user of the terminal device 101.

In addition, a user want to be able to view a task of another user at any time through the task management client. For example, he/she can search for a user and view a task of the user by a user ID, and so on.

FIG. 2 is a schematic diagram of a task management interface of user A displayed in the task management client provided by some embodiments of the present disclosure. As shown in FIG. 2, a task of user A is displayed on a task management interface of user A, comprising an objective and sub-objectives 1, 2, and 3 corresponding to the objective. User A references user B in the objective, and references users C, D, and E separately in sub-objectives 1, 2, and 3, indicating that the objective of the task may have an association with user B, the sub-objective 1 of the task may have an association with user C, the sub-objective 2 may have an association with user D, and the sub-objective 3 may have an association with user E. This facilitates users B, C, D, and E to align their own tasks with the task of user A. After a task alignment, an associate between the objective of user A and the tasks of users B, C, D, and E is established.

In the above application scenario, in order to further facilitate a user to view task information of another user associated with his/her own task, some embodiments of the present disclosure provide an information processing method, which can be performed by the terminal device 101 described above.

FIG. 3 is a flowchart of the information processing method provided by some embodiments of the present disclosure. As shown in FIG. 3, the method may comprise: steps 302 to 308.

In step 302, a first task information entry and a user control of a second user associated with the first task information entry are displayed on a task interface of a first user.

As described above, in some embodiments of the present disclosure, a user may reference another user when entering and editing his/her own task, indicating that the task may have an association with the task of the referenced user. For example, the first user can enter the first task information entry on his/her own task interface followed by a preset user identifier prompt, such as @, and then enter or select a user identifier of the second user prompted by a system to indicate that there may be an association between the first task information entry and a task of the second user. At this point, the user control for the second user associated with the first task information entry will be generated and displayed at a current position on the task interface of the first user. The user control has attribute information comprising: an identifier of the second user and an identifier of the first task information entry associated with the user control. Therefore, if the first user associates his/her first task information entry with the second user in the above manner, when the first task information entry is viewed, the first task information entry and the user control of the second user associated with the first task information entry are displayed on the task interface of the first user.

In step 304, at least one second task information entry of the second user is obtained in response to a preset operation on the user control.

Specifically, in some embodiments of the present disclosure, the obtaining at least one second task information entry of the second user may comprise: obtaining an identifier of the second user and an identifier of the first task information entry from attribute information of the user control; and obtaining the at least one second task information entry of the second user from a task management server based on the identifier of the second user and the identifier of the first task information entry.

In some embodiments of the present disclosure, the above preset operation may specifically refer to a preset system event, and this disclosure does not limit a specific form of such system event. For example, taking a desktop or mobile computer as the terminal device 101, the preset operation may refer to moving a cursor to the user control or clicking or double-clicking the user control. For another example, taking a mobile phone, a tablet, a media player, a smart wearable device, a PDA, or another electronic device as the terminal device 101, the preset operation may refer to clicking or double-clicking on the user control, etc.

In some embodiments of the present disclosure, when the preset system event is detected, the terminal device 101 may obtain the identifier of the second user and the identifier of the first task information entry from the attribute information of the user control.

In some embodiments of the present disclosure, in step 304, the terminal device 101 may send a task information acquisition request to the task management server 102, in which the identifier of the second user and the identifier of the first task information entry are carried. Then, the terminal device 101 can directly receive at least one second task information entry of the second user returned by the task management server 102.

In this case, in some embodiments of the present disclosure, the task management server 102 may extract all task information of the second user from the data storage system 103 based on the identifier of the second user that is carried in the task information acquisition request. The task management server 102 then extracts the at least one second task information entry associated with the first task information entry from all the task information based on the identifier of the first task information entry and task association information stored thereon.

In addition, step 304 may further comprise: determining a correlation between the at least one second task information entry and the first task information entry.

Finally, the task management server 102 returns the at least one second task information entry and the correlation between the at least one second task information entry and the first task information entry to the terminal device 101.

In other embodiments of the present disclosure, if the data storage system 103 also stores associations of task information entries, based on the identifier of the second user and the identifier of the first task information entry carried in the task information acquisition request, the task management server 102 can directly extract the at least one second task information entry associated with the first task information entry from task information published by the second user in the data storage system 103. Then, the task management server 102 determines a correlation between the at least one second task information entry and the first task information entry, and returns the at least one second task information entry and the determined correlation to the terminal device 101.

It should be noted that the specific operations of the task management server 102 will be described in detail later and are briefly omitted here.

In step 306, a task sub-interface of the second user is displayed on the task interface of the first user.

In some embodiments of the present disclosure, the task sub-interface of the second user is used to display task information of the second user. The task sub-interface of the second user can be presented in a form of a pop-up window.

In step 308, the at least one second task information entry is displayed on the task sub-interface of the second user based on the correlation between the at least one second task information entry and the first task information entry.

In some embodiments of the present disclosure, a filtering process can be performed on the at least one second task information entry based on the correlation between the at least one second task information entry and the first task information entry, so as to remove a task information entry with a low correlation and display an information entry with a high correlation.

Specifically, a correlation threshold can be set in advance, and the correlation between the at least one second task information entry and the first task information entry can be compared with the correlation threshold. When displaying a task information entry, only a second task information entry with the correlation greater than the correlation threshold with the first task information entry can be displayed.

It should be noted that in the above embodiment, if it is determined that the correlation between any of the at least one second task information entry and the first task information entry is less than or equal to the correlation threshold, all the at least one second task information entry may optionally be displayed, instead of not displaying any task information entry. Of course, alternatively, the above correlation threshold can be appropriately lowered in this case, so that the correlation between one (or more) second task information entry and the first task information entry is greater than the adjusted correlation threshold. Alternatively, a minimum number parameter n ($n \geq 1$, n is an integer) can be set. Regardless of whether the correlation is less than the correlation threshold, at least n second task information entries can be displayed on the task sub-interface of the second user.

Furthermore, in the above embodiments, in order to prevent missing display of task information entries and make it more convenient for a user to operate and use, it is also possible to provide a fold control and an unfold control (a fold/unfold control) on the task sub-interface of the second user, and to specify preset operations for the fold control and the unfold control, such as click or double-click operations. In response to a preset operation on the unfold control being detected, all the at least one second task information entry can be displayed on the task sub-interface of the second user without a consideration of an effect of the correlation. In response to a preset operation on the fold control being detected, only the second task information entry with the correlation greater than the above correlation threshold with the first task information entry can be displayed on the task sub-interface of the second user.

In other embodiments of the present disclosure, the at least one second task information entry may be sorted based on the correlation between the at least one piece of second task information and the first task information entry, and may be displayed in a descending order of the correlation between the at least one piece of second task information and the first task information entry. Moreover, when displaying the at least one the second task information entry, the correlation between each of the at least one second task information entry and the first task information entry can be further displayed.

In the embodiment, it is also possible to further use a preset correlation threshold to remove a second task information entry with a low correlation while displaying only a second task information entry with a high correlation. Alternatively, the fold control and the unfold control described above can be provided to control a number of a second task information entry displayed.

By using the above information processing method, when the preset operation performed by the first user on the user control of the second user is detected on the task interface of the first user, the terminal device can pop up the task sub-interface comprising the task information of the second user. Through the task sub-interface, the first user can directly and quickly view the task information of the second user associated with his or her own task. In addition, based on a correlation between tasks, the first user can prioritize viewing a task among the tasks of the second user that is highly correlated with his or her own task, or only view a task among the tasks of the second user that is correlated with his or her own task. In this way, through the above method for displaying task information based on the correlation, for example, a method of information filtering or sorting, a user can focus only on, or prioritize, a task correlated to his or her own task, thereby effectively improving an operational efficiency and greatly enhancing an experience of the user.

A specific application scenario in which a task management system is configured to task management will be described below as an example to illustrate the information processing method provided by some embodiments of the present disclosure.

The information processing method provided in the embodiments of the present disclosure can be performed by a terminal device 101 having a task management client installed. In this method, a second user is referenced in a sub-objective of a first user, and at least one objective of the second user has been associated with an objective corresponding to the above sub-objective, that is, the at least one objective of the second user has been aligned with the objective of the first user. In the embodiments, for the sake of convenience in description, the sub-objective of the first user is referred to as the first sub-objective, and the objective corresponding to the first sub-objective is referred to as the first objective; the objective of the second user is referred to as the second objective, and the sub-objective of the second user is referred to as the second sub-objective.

FIG. 4 is a flowchart of an information processing method in a task management system provided by some embodiments of the present disclosure. As shown in FIG. 4, the method may comprise: steps 402 to 410.

In step 402, a first objective and a first sub-objective of a first user, and a user control of a second user associated with the first sub-objective are displayed on a task interface of the first user.

As described above, if the first user references the second user in one of his/her own sub-objectives, the user control of the second user associated with that sub-objective will be generated and displayed on the task interface of the first user. Attribute information of the user control comprises: an identifier of the second user, an identifier of a sub-objective (i.e. an identifier of the first sub-objective), and an identifier of the objective corresponding to the above sub-objective (i.e. the identifier of the first objective).

Figures 5, 6:
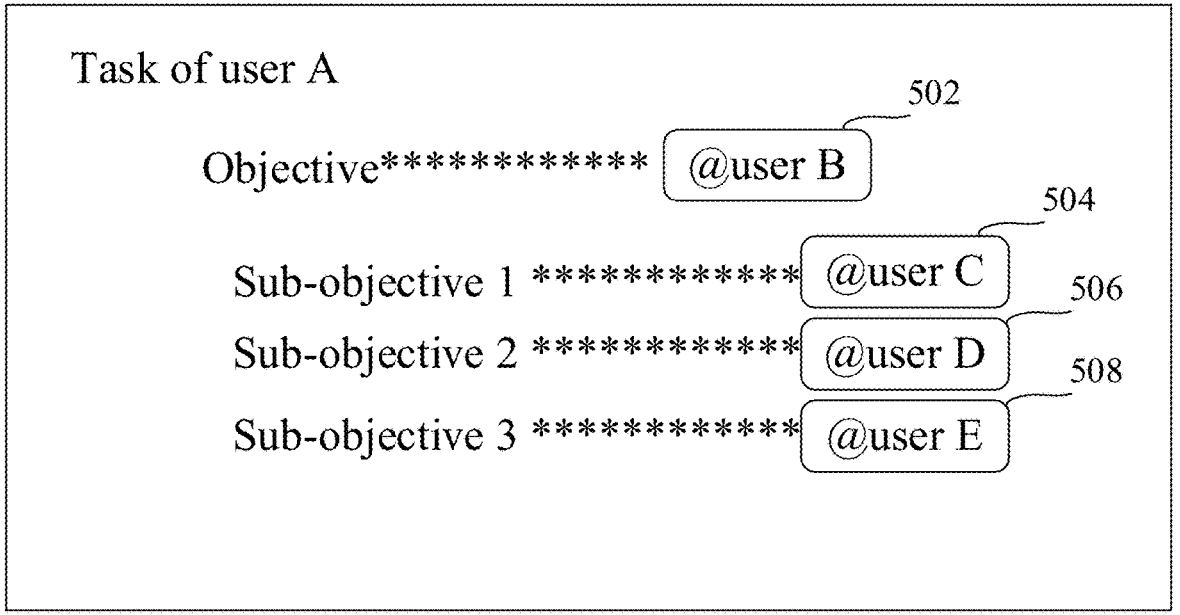
FIG. 5 is a diagram of a task interface of user A provided by some embodiments of the present disclosure.
FIG. 6 shows a schematic diagram of a task management interface displayed by a task management client when a user moves a mouse cursor to a user control of user D shown in FIG. 5 in some embodiments of the present disclosure.

FIG. 5 is a diagram of a task interface of user A provided by an embodiment of the present disclosure. It should be noted that the task interface can be a task management interface displayed on a desktop or mobile computer. For a portable device such as a mobile terminal, a PAD, or a personal wearable device, the task management interface displayed is similar to that shown in FIG. 5, except that a layout and preset operations may be slightly different. As shown in FIG. 5, user B is referenced in an objective of user A. Therefore, a user control 502 of user B is displayed in information of the objective. Attribute information of the user control 502 comprises an identifier of user B and an identifier of the objective; user C is referenced in sub-objective 1 of the objective of user A. Therefore, a user control 504 of user C is displayed in information of sub-objective 1. Attribute information of the user control 504 comprises an identifier of user C, an identifier of the objective of user A, and an ID of sub-objective 1; user D is referenced in sub-objective 2 of the objective of user A. Therefore, a user control 506 of user D is displayed in the information of sub-objective 2. Attribute information of the user control 506 comprises an identifier of user D, an identifier of the objective of user A, and an ID of sub-objective 2; user E is referenced in sub-objective 3 of the objective of user A. Therefore, a user control 508 of user E is displayed in the information of sub-objective 3. Attribute information of the user control 508 comprises an identifier of user E, an identifier of the objective of user A, and an ID of sub-objective 3.

In step 404, in response to a preset operation on the user control, the identifier of the second user, the identifier of the first sub objective, and the identifier of the first objective are obtained from the attribute information of the above user control.

As described above, the above preset operation specifically refers to a preset system event, and this disclosure does not limit the specific form of such system event.

Taking the task management interface shown in FIG. 5 as an example, when the user moves a mouse cursor over the user D control, the task management client will obtain the identifier of user D, the identifier of the objective of user A, and the identifier of sub-objective 2.

In step 406, based on the identifier of the second user, the identifier of the first objective, and the identifier of the first sub-objective, at least one second objective of the second user and at least one second sub-objective comprised therein, as well as a correlation between the at least one second sub-objective and the first sub-objective are obtained.

As described above, in step 406, the terminal device 101 may send a task information acquisition request to the task management server 102, in which the identifier of the second user, the identifier of the first task, and the identifier of the first sub-objective are carried. Then, the terminal device 101 can directly receive the at least one second objective of the second user and the at least one second sub-objective contained therein that are returned by the task management server 102. The at least one second objective of the second user returned by the task management server 102 should be an objective that has been already associated or aligned with the first objective. That is to say, if the second user has not aligned the objective with the first objective of the first user, the task management server 102 will not return that objective of the second user and its contained sub-objective(s). In addition, the terminal device 101 also receives the correlation between the at least one second sub-objective of the second user and the first sub-objective returned by the task management server 102. The specific operations of the task management server 102 will be described in detail later and are briefly omitted here.

In step 408, a task sub-interface of the second user is displayed on the task interface of the first user.

In some embodiments of the present disclosure, the task sub-interface of the second user is used to display task information of the second user. For example, a task card of the second user is displayed in a pop-up window.

In step 410, the at least one second objective and a second sub-objective comprised in the at least one second objective are displayed on the task sub-interface of the second user based on the correlation between the at least one second sub-objective and the first sub-objective.

As described above, in some embodiments of the present disclosure, a filtering process can be performed on the at least one second sub-objective based on the correlation between the at least one second sub-objective and the first sub-objective, so as to remove a second sub-objectives with a correlation less than a correlation threshold. Specifically, the correlation between the second sub-objective and the first sub-objective can be compared one by one with a preset correlation threshold, and one or more second objectives and one or more second sub-objectives on the task sub-interface of the second user can be displayed one by one on the task sub-interface of the second user and the one or more second objectives comprise the one or more second sub-objectives and the one or more second sub-objectives have correlations greater than the preset correlation threshold. The above one-by-one display refers to display on the basis of objectives. In each objective, one or more sub-objectives with correlations greater than the above correlation threshold are displayed one by one.

FIG. 6 shows a schematic diagram of a task management interface displayed by a task management client when a user moves a mouse cursor to the user control of user D shown in FIG. 5 in some embodiments of the present disclosure. As shown in FIG. 6, only the objective O2 of user D and its contained sub-objectives 2 and 3 having correlations greater than the correlation threshold with the sub-objective 2 in objective O1 of user A are displayed on the task sub-interface 602 of user D in FIG. 6, while the sub-objective 1 in objective O2 of user D having a correlation less than the correlation threshold with the sub-objective 2 in objective O1 of user A is filtered out.

With the above method, it is possible to effectively avoid interference from less correlated task information for user A, allowing user A to focus only on task information correlated with sub-objective 2 in objective O1.

Furthermore, in the above scenario, if the task information returned by the task management server for user D contains at least two objectives and sub-objectives contained therein, and all sub-objectives in one of these objectives, e.g., objective O3 have correlations less than the correlation threshold with sub-objective 2 in objective O1 of user A, then the objective O3 and all its sub-objectives can be omitted from the task sub-interface of user D. That is, in response to determining that at least one of the second sub-objectives comprised in the second objective has the correlation greater than the correlation threshold with the first sub-objective, the second objective and the second sub-objectives comprised in the second objective having the correlation greater than the correlation threshold are displayed.

As described above, it is also possible to provide the fold control and the unfold control on the task sub-interface of the second user, and to specify the preset operations for the fold control and the unfold control to control the number of second task information displayed.

FIG. 7*a* shows a schematic diagram of a task management interface displayed by a task management client when a user moves a mouse cursor to the user control of user D shown in FIG. 5 in some embodiments of the present disclosure. As shown in FIG. 7*a*, only the objective O2 of user D and its contained sub-objectives 2 and 3 having correlations greater than the correlation threshold with the sub-objective 2 in objective O1 of user A are displayed on the task sub-interface 602 of user D in FIG. 7a, while the sub-objective 1 in objective O2 of user D having a correlation less than the correlation threshold with the sub-objective 2 in objective O1 of user A is filtered out. Moreover, since filtered task information is not displayed on the task sub-interface of user D shown in FIG. 7a, a unfold control 702 is displayed at the bottom of the task sub-interface of user D. In addition, in order to remind user A that task information currently displayed is task information after filtering, a prompt message "Uncorrelated Tasks Have been Folded" is also displayed at the bottom of the task sub-interface of user D. When user A clicks on the unfold control 702, the task management interface shown in FIG. 7b is displayed by the task management client.

FIG. 7b shows a schematic diagram of the task management interface displayed by the task management client when the unfold control shown in FIG. 7a is clicked in the embodiment of the present disclosure. As shown in FIG. 7b, all objectives and correlated sub-objectives of the user D are displayed on the task sub-interface of user D in FIG. 7b. Accordingly, the fold control 704 and a prompt message "Uncorrelated Tasks Have Been Unfolded" are displayed at the bottom of the task sub-interface of user D. When user A clicks on the fold control 704, the task management interface shown in FIG. 7a is displayed by the task management client.

As described above, in other embodiments of the present disclosure, a correlation between each objective and a sub-objective of the first user can be determined based on the correlation between each sub-objective and the sub-objective of the first user. Then, a plurality of objectives are sorted based on the correlation between each objective and the sub-objective of the first user, and the objectives with high correlations and sub-objectives comprised in the objectives are displayed first. Within each objective, it is possible to further sort the sub-objectives comprised in the objective by correlation. It is even possible to further display a correlation value after each sub-objective.

In the embodiments, there are various methods to determine the correlation between each objective and the sub-objective of the first user based on the correlation between each sub-objective and the sub-objective of the first user. For example, correlations of all sub-objectives comprised in an objective can be summed up or averaged, or only a maximum correlation value is selected as the correlation between the objective and the sub-objective of the first user, and so on.

It can be seen that through the above information processing method, the first user can directly view a task of the second user that is associated with a sub-objective in his/her own task by a preset operation on the interface for viewing his/her own task. In addition, based on correlations between tasks, the first user can prioritize viewing a sub-objective in the task of the second user with a higher correlation with his/her own sub-objective. In this way, by filtering or sorting the task information displayed, it can help a user focus on or prioritize only tasks of others associated with his or her own sub-objective, thereby improving operational efficiency and enhancing the user experience.

The information processing method provided in other embodiments of the present disclosure can be performed by a terminal device 101 having a task management client installed. In this method, a second user is referenced in an objective of a first user, and at least one objective of the second user has been associated with the objective, that is, the at least one objective of the second user has been aligned with this objective. In the embodiment, for the sake of convenience in description, the objective of the first user is referred to as the first objective, and the objective of the second user is referred to as the second objective.

FIG. 8 is a flowchart of an information processing method in a task management system provided by an embodiment of the present disclosure. As shown in FIG. 8, the method may comprise: steps 802 to 810.

In step 802, a first objective of a first user and a user control of a second user associated with the first objective are displayed on a task interface of the first user.

As described above, if the first user references the second user in one of his/her objectives, the user control of the second user associated with the objective will be generated and displayed on the task interface of the first user. Attribute information of the user control comprises: an identifier of the second user and an identifier of the above objective (i.e., an identifier of the first objective).

In step 804, in response to a preset operation on the user control, the identifier of the second user and the identifier of the first objective are obtained from the attribute information of the user control.

As described above, the above preset operation specifically refers to a preset system event, and this disclosure does not limit the specific form of such system event.

Taking the task management interface shown in FIG. 5 as an example, when the user moves a mouse cursor over the user B control, the task management client will obtain the identifier of user B and the identifier of objective O1.

In step 806, based on the identifier of the second user and the identifier of the first objective, at least one second objective of the second user and at least one second sub-objective comprised therein, as well as a correlation between the at least one second objective and the first objective are obtained.

In some embodiments of the present disclosure, the above task management server will further return the correlation between the at least one second sub-objective and the first objective.

As described above, in step 806, the terminal device 101 may send a task information acquisition request to the task management server 102, in which the identifier of the second user and the identifier of the first task are carried. Then, the terminal device 101 can directly receive the at least one second task of the second user and the at least one second sub-objective comprised therein that are returned by the task management server 102. The at least one second objective of the second user returned by the task management server 102 should be an objective that is associated or aligned with the first objective. That is to say, if the second user has not aligned his/her objective(s) with the first objective of the first user, the task management server 102 will not return the objective(s) of the second user and a sub-objective(s) comprised in the objective(s).

In addition, the terminal 101 also receives a correlation between the at least one second objective of the second user and the first objective, and additionally a correlation between the at least one second sub-objective and the first objective. The specific operations of the task management server 102 will be described in detail later and are briefly omitted here.

In step 808, a task sub-interface of the second user is displayed on the task interface of the first user.

In some embodiments of the present disclosure, the task sub-interface of the second user is used to display task information of the second user. For example, a task card of the second user is displayed in a pop-up window.

In step 810, the at least one second objective and a second sub-objective(s) comprised in the at least one second objective are displayed on the task sub-interface of the second user based on the correlation between the at least one second objective and the first objective.

As described above, in some embodiments of the present disclosure, the at least one second objective may be sorted based on the correlation between the at least one second objective and the first objective, with priority given to displaying the second objective having a high correlation.

In addition, in other embodiments of the present disclosure, the at least one second objective may also be filtered based on the correlation between the at least one second objective and the first objective, thereby removing the second objective having a low correlation with the first objective.

Furthermore, if the task management server further returns a correlation between the at least one second sub-objective and the first objective, the second sub-objective(s) comprised in each second objective can be further sorted or filtered based on the correlation between the at least one second sub-objective and the first objective. The sorting and filtering methods are similar to those shown in FIG. 4, and will not be repeated here.

It can be seen that through the above information processing method, the first user can directly view a task of the second user that is associated with an objective in his/her task by a preset operation on the interface for viewing his/her task. In addition, based on correlations between tasks, the first user can prioritize viewing an objective and a sub-objective in the task of the second user with a correlation with his/her her objective. In this way, by filtering or sorting the task information displayed, it can help a user focus on or prioritize only a task of others associated with his/her task, thereby improving operational efficiency and enhancing the user experience.

In addition, it should be noted that a task management interface displayed on a desktop computer or a mobile computer is illustrated as an example in the above diagrams of the task management interface. For a device such as a mobile terminal, a PAD, or a personal wearable device, the task management interface displayed is similar to the above interface, with substantially the same content, except that layouts and preset operations may be slightly different, and thus will not be shown repeatedly.

Operations of the task management server will be described in detail with reference to the drawings. FIG. 9 is a flowchart of an information processing method performed by a task management server provided by some embodiments of the present disclosure. As shown in FIG. 9, this method comprises: steps 902 to 908.

In step 902, a task information acquisition request is received from a first user client, wherein an identifier of a second user and an identifier of a first task information entry are carried in the task information acquisition request.

In step 904, at least one second task information entry of the second user is extracted from a data storage system based on the identifier of the second user.

In some embodiments of the present disclosure, the above data storage system stores task information published by users. The task information stored in the above data storage system is usually indexed by identifiers of the users. Therefore, the task management server can extract the at least one second task information entry of the second user from the data storage system based on the identifier of the second user.

In addition, in some embodiments of the present disclosure, the above data storage system may further store association information between tasks. In this case, based on the identifier of the second user and the identifier of the first task information entry, the above task management server can extract the at least one second task information entry associated with the first task information entry among the task information entries published by the second user from the data storage system.

In a specific task management system, in addition to the task information published by the users, the data storage system can also store alignment relationships between tasks. In this way, when the task management server extracts a task information entry published by the second user from the data storage system, at least the identifier of the first objective must be carried. In this case, the data storage system returns information of a task that is published by the second user and is aligned with the first objective to the task management server, comprising an objective aligned with the first objective and sub-objectives comprised in the objective.

In step 906, a correlation between the at least one second task information entry and the first task information entry is determined based on the identifier of the first task information entry.

In some embodiments of the present disclosure, the above task management server may determine the correlation between the at least one second task information entry and the first task information entry in various methods.

Specifically, in some embodiments of the present disclosure, when establishing an association between task information entries, the second user further sets an association parameter for his/her own second task information entry and the first task information entry. In the above embodiments, the task management server can determine a correlation between the at least one second task information entry and the first task information entry based on the association parameter set by the second user.

In some embodiments of the present disclosure, the above association parameter may be a correlation value between the second task information entry and the first task information entry. For example, uncorrelated task information entries have a default correlation value of 0, and correlated task information entries have a correlation value set in a range based on actual conditions, such as an arbitrary value between 0 and 1. The above association parameter can be recorded in the above task management server or data storage system. In this way, the above task management server can directly determine the correlation between the at least one second task information entry and the first task information entry based on the correlation value set by the user. For example, when performing a task alignment, the second user can be further requested to align a sub-objective comprised in an aligned objective with an objective or a sub-objective the first user. In this case, the above task management server can determine the correlation between the second objective or second sub-objective and the first objective or first sub-objective based on an alignment result of the second user. For example, for an aligned sub-objective, a relatively high correlation is set, while for a non-aligned sub-objective, a relatively low correlation is set.

In other embodiments of the present disclosure, the above association parameter may also be an importance value, an urgency value, or a proportion parameter of a second task. For example, when a user enters a sub-objective comprised in an objective, a ratio of that sub-objective to its corresponding objective may usually be entered. In this case, in some embodiments of the present disclosure, the above task management server may determine the correlation between the second objective or second sub-objective and the first objective or first sub-objective based on the ratio of each second sub-objective to the second objective and the ratio of each first sub-objective to the first objective. For example, the above ratio can be directly used as the above correlation, and so on.

In some other embodiments of the present disclosure, the above task management server may determine a textual similarity between the at least one second task information entry and the first task information entry using an existing textual similarity algorithm or a machine learning model established based on a textual similarity algorithm, and determine the above correlation based on the textual similarity. For example, the higher the textual similarity, the higher the correlation between the task information entries, and so on.

Further, it is also possible to comprehensively determine the correlation between the at least one second task information entry and the first task information entry by combining the above methods.

It should be noted that if association information between tasks is stored in advance on the above task management server, the above task management server can first determine whether at least one second task information entry of the second user extracted from the data storage system is associated with the first task information entry, remove a second task information entry that is not associated with the first task information entry from the at least one second task information entry, and then determine the correlation between the second task information entry associated with the first task information entry and the first task information entry.

In step 908, the at least one second task information entry and the correlation between the at least one second task information entry and the first task information entry are returned to the first user client.

It can be seen that in the above information processing method, the task management server extracts the at least one second task information entry of the second user associated with the first task information entry based on the user's request, and determines the correlation between the extracted second task information entry and the first task information entry, thereby assisting the terminal device to display the task of the second user associated with the first task information entry based on the correlation between the tasks. In this way, it can help users focus on or prioritize only a task of others associated with his/her task, thereby improving operational efficiency and enhancing the user experience.

It should be noted that the method of the embodiments of the present disclosure can be performed by a single device, such as a computer or a server. The method of the embodiments can also be applied in a distributed scenario, where multiple devices cooperate with each other to perform the method. In the distributed scenario, one of the multiple devices may only perform one or more steps in the method of the embodiments of the present disclosure, and the multiple devices interact with each other to complete the method.

It should be noted that some embodiments of the present disclosure have been described above. Other embodiments are within the scope and spirit of the disclosure and appended claims. In some cases, the actions or steps recited in the claims may be carried out in a different order from the embodiments and still achieve the desired results. In addition, the processes shown in the drawings do not necessarily require a specific or sequential order to achieve the desired results. In some embodiments, multitasking and parallel processing may be advantageous.

Figure 10:
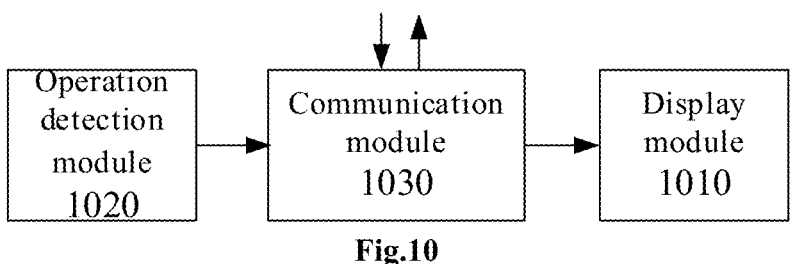
FIG. 10 shows a schematic diagram of an internal structure of an information processing apparatus provided by some embodiments of the present disclosure.

Based on the same inventive concept and corresponding to any of the above embodiments, this disclosure also provides an information processing apparatus. FIG. 10 shows a schematic diagram of the internal structure of an information processing apparatus provided by some embodiments of the present disclosure. The information processing apparatus shown in FIG. 10 is located in a terminal device 101. As shown in FIG. 10, the above information processing apparatus may comprise: a display module 1010, an operation detection module 1020, and a communication module 1030.

In some embodiments of the present disclosure, the display module 1010 is configured to display a first task information entry and a user control of a second user associated with the first task information entry on a task interface of a first user.

The operation detection module 1020 is configured to detect a preset operation on the user control.

The communication module 1030 is configured to obtain at least one second task information entry of the second user.

The display module 1010 is further configured to display a task sub-interface of the second user on the task interface of the first user; and display the at least one second task information entry on the task sub-interface of the second user based on a correlation between the at least one second task information entry and the first task information entry.

Figure 11:
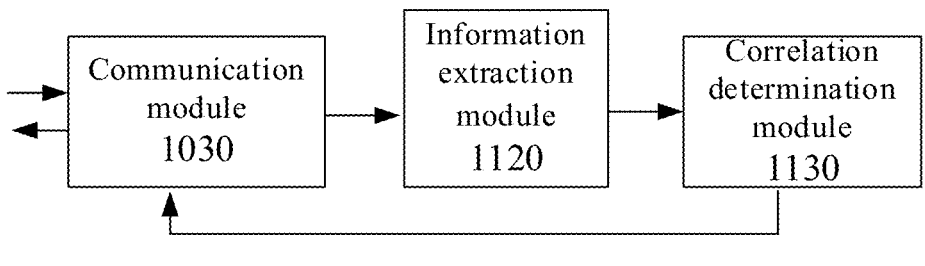
FIG. 11 shows a schematic diagram of an internal structure of an information processing apparatus provided by other embodiments of the present disclosure.

FIG. 11 shows a schematic diagram of the internal structure of an information processing apparatus provided by some embodiments of the present disclosure. The information processing apparatus shown in FIG. 11 is located in a task management server 102. As shown in FIG. 11, the above information processing apparatus may comprise: a communication module 1110, an information extraction module 1120, and a correlation determination module 1130.

In some embodiments of the present disclosure, the communication module 1110 is configured to receive a task information acquisition request from a first user client, wherein an identifier of the second user and an identifier of the first task information entry are carried in the task information acquisition request.

The information extraction module 1120 is configured to extract at least one second task information entry of the second user from a data storage system based on the identifier of the second user.

The correlation determination module 1130 is configured to determine the correlation between the at least one second task information entry and the first task information entry based on the identifier of the first task information entry.

The communication module 1110 is further configured to return the at least one second task information entry and the correlation between the at least one second task information entry and the first task information entry to the first user client.

Reference can be made to the previous methods and drawings for the implementation of the various modules described above, which will not be repeated here. For the convenience of description, the above apparatus is divided into various modules based on their functions. Of course, in the implementation of this disclosure, the function of each module may be implemented in the same or different software and/or hardware.

The apparatus of the above embodiment is used to implement the information processing method in any of the above embodiments, and has the beneficial effects of the corresponding method embodiment, which will not be repeated here.

Based on the same inventive concept and corresponding to any of the above embodiments, the present disclosure further provides an electronic device comprising a memory, a processor, and a computer program stored in the memory and executable by the processor, wherein the processor, when executing the program, performs the information processing method of any one of the above embodiments.

Figure 12:
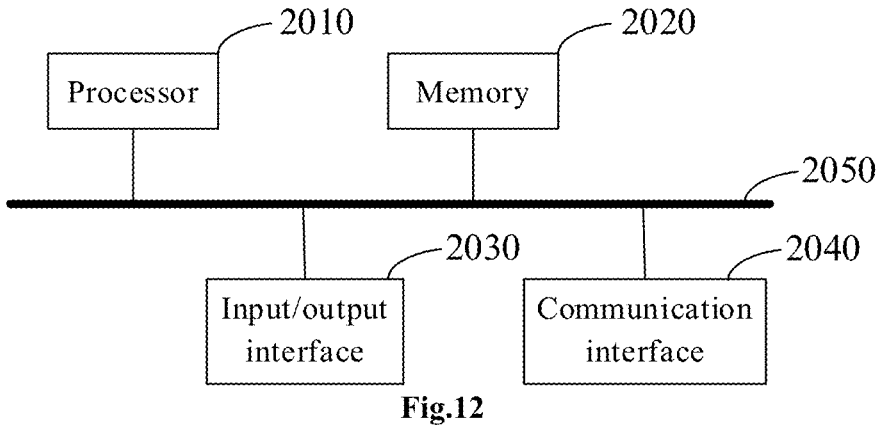
FIG. 12 shows a schematic structure diagram of a more detailed hardware structure of an electronic device provided by some embodiments of the present disclosure.

FIG. 12 shows a schematic structure diagram of a more detailed hardware structure of an electronic device provided by this embodiment. The device may comprise: a processor 2010, a memory 2020, an input/output interface 2030, a communication interface 2040, and a bus 2050. The processor 2010, the memory 2020, the input/output interface 2030, and the communication interface 2040 are connected to each other through the bus 2050 for communication within the device.

The processor 2010 may be implemented using a general purpose central processing unit (CPU), a microprocessor, an application specific integrated circuit (ASIC), or one or more integrated circuits to execute related programs and implement the technical solution provided in the embodiments of this description.

The memory 2020 can be implemented in various forms such as ROM (Read Only Memory), RAM (Random Access Memory), static storage devices and dynamic storage devices, etc. The memory 2020 may store operating systems and other application programs. When the technical solutions provided in the embodiments of this description are implemented by software or firmware, the corresponding program codes are stored in the memory 2020 and invoked and executed by the processor 2010.

The input/output interface 2030 is used to connect input/output modules for information input and output. The input/output modules can be provided as components in the device (not shown in the figure), or can be connected externally to the device to provide appropriate functions. The input device can comprise a keyboard, a mouse, a touch screen, a microphone, various sensors, etc., while the output device can comprise a display, a speaker, a vibrator, an indicator light, etc.

The communication interface 2040 is used to connect communication modules (not shown in the figure) to achieve communication interaction between this device and other devices. The communication module can communicate in wired manners (e.g., via USB, Ethernet cables, etc.) or wireless manners (e.g., via mobile networks, WIFI, Bluetooth, etc.).

The bus 2050 comprises a path for transmitting information between various components of the device (e.g., the processor 2010, the memory 2020, the input/output interface 2030, and the communication interface 2040).

It should be noted that although only the processor 2010, the memory 2020, the input/output interface 2030, the communication interface 2040, and the bus 2050 are illustrated in the above device, in specific implementations, the device may also comprise other components necessary for normal operation. In addition, those skilled in the art will understand that the above device may comprise only those components necessary to implement the embodiments of this description and not necessarily all the components shown in the figure.

The electronic device of the above embodiment is used to implement the information processing method in any of the above embodiments, and has the beneficial effects of the corresponding method embodiment, which will not be repeated here.

Based on the same inventive concept and corresponding to any of the above embodiments, the present disclosure further provides a non-transitory computer-readable storage medium, characterized in that the non-transitory computer-readable storage medium stores computer instructions used to cause a computer to perform the information processing method in any of the above embodiments.

The computer-readable medium in this embodiment comprises permanent and non-permanent, removable and non-removable media, and information storage can be realized by any method or technology. The information can be computer-readable instructions, data structures, program modules, or other data. Examples of computer storage media comprise, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, CD-ROM, digital versatile disc (DVD) or other optical storage, magnetic cassettes, magnetic tape, magnetic disk storage or other magnetic storage devices, or any other non-transmission media that can be used to store information that can be accessed by computing devices.

The computer instructions stored in the storage medium of the above embodiment is used to implement the information processing method in any of the above embodiments, and has the beneficial effects of the corresponding method embodiment, which will not be repeated here.

It should be understood by those of ordinary skill in the art that the discussion of any of the above embodiments is merely exemplary and is not intended to suggest that the scope of the disclosure (comprising the claims) is limited to these examples; in the concepts of this disclosure, combinations of the technical features in the above embodiments or different embodiments can also be combined, the steps can be carried out in any order, and there are many other variations of the various aspects of the present disclosure as described above, which are not provided in detail for the sake of brevity.

In addition, for ease of explanation and discussion and to avoid making the embodiments difficult to understand, known power/ground connections to integrated circuit (IC) chips and other components may or may not be shown in the drawings provided herein. In addition, the apparatus may be shown in the form of block diagrams to avoid making the embodiments difficult to understand, and this also takes into account the fact that the details of the implementation of the apparatus in these block diagrams are highly dependent on the platform on which the embodiment is implemented (i.e., these details should be fully within the understanding of those skilled in the art). It will be apparent to those skilled in the art that specific details (e.g., circuits) have been elaborated to describe the exemplary embodiments of the present disclosure, and it is possible to implement the embodiments of the present disclosure without these specific details or with changes to these specific details. Therefore, these descriptions should be considered explanatory rather than restrictive.

Although the present disclosure has been described in conjunction with specific embodiments, many substitutions, modifications, and variations of these embodiments will be apparent to those skilled in the art based on the forgoing description. For example, other memory architectures (such as Dynamic RAM (DRAM)) can be used in the discussed embodiments.

The embodiments of the present disclosure are intended to cover all such substitutions, modifications and variations falling within the broad scope of the appended claims. Within spirit and principles of the embodiments of the present disclosure, any omissions, modifications, equivalent replacements, improvements etc. shall be contained in the protection scope of this invention.

What is claimed is:

1. An information processing method, comprising:

displaying a first objective and a plurality of first sub-objectives comprised in the first objective of a first task information entry of a first user and a user control of a user associated with each of the plurality of first sub-objectives in correspondence with each of the plurality of first sub-objectives on a task interface of the first user, wherein a second user is a user associated with a certain first sub-objective;

obtaining at least one second task information entry of the second user in response to a trigger operation on the user control of the second user, wherein the at least one second task information entry comprises a second objective associated with the first objective and a plurality of second sub-objectives comprised in the second objective;

displaying a task sub-interface of the second user on the task interface of the first user;

displaying the at least one second task information entry on the task sub-interface of the second user based on a correlation between the at least one second task information entry and the first task information entry, comprising: comparing a correlation between the plurality of second sub-objectives and the first sub-objective associated with the second user with a preset correlation threshold, and displaying, one by one, one or more second objectives and one or more second sub-objectives on the task sub-interface of the second user, wherein the one or more second objectives comprise the one or more second sub-objectives and one or more correlations between the one or more second sub-objectives and the first sub-objective associated with the second user are greater than the preset correlation threshold, displaying an unfold control and a first prompt, wherein the first prompt is configured for indicating part of second sub-objectives are hidden, and displaying all the second sub-objectives and second objectives in response to a triggering option on the unfold control, wherein each correlation is determined via a machine learning model;

displaying a fold control on the task sub-interface of the second user, and displaying the second task information entries with the correlation greater than the preset correlation threshold on the task sub-interface of the second user in response to a preset operation on the fold control.

2. The information processing method according to claim 1, wherein the displaying the at least one second task information entry on the task sub-interface of the second user based on a correlation between the at least one second task information entry and the first task information entry comprises:

comparing the correlation between the at least one second task information entry and the first task information entry with a preset correlation threshold; and displaying a second task information entry with the correlation greater than the correlation threshold on the task sub-interface of the second user.

3. The information processing method according to claim 2, wherein the displaying the at least one second task information entry on the task sub-interface of the second user based on a correlation between the at least one second task information entry and the first task information entry further comprises:

displaying all the at least one second task information entry on the task sub-interface of the second user in response to determining that the correlation between any of the at least one second task information entry and the first task information entry is less than or equal to the correlation threshold.

4. The information processing method according to claim 1, wherein the displaying the at least one second task information entry on the task sub-interface of the second user based on a correlation between the at least one second task information entry and the first task information entry comprises:

sorting the at least one second task information entry based on the correlation between the at least one piece of second task information and the first task information entry; and displaying the at least one second task information entry on the task sub-interface of the second user in a descending order of the correlation between the at least one piece of second task information and the first task information entry.

5. The information processing method according to claim 4, wherein the displaying the at least one second task information entry on the task sub-interface of the second user in descending order of the correlation between the at least one piece of second task information and the first task information entry comprises:

displaying the at least one second task information entry and the correlation between the at least one piece of second task information and the first task information entry on the task sub-interface of the second user in descending order of the correlation between the at least one piece of second task information and the first task information entry.

6. The information processing method according to claim 4, wherein the displaying the at least one second task information entry on the task sub-interface of the second user in descending order of the correlation between the at least one piece of second task information and the first task information entry comprises:

displaying one or more second task information entries with correlations greater than the correlation threshold on the task sub-interface of the second user in descending order of the correlation between the at least one piece of second task information and the first task information entry.

7. The information processing method according to claim 1, wherein the displaying, one by one, one or more second objectives and one or more second sub-objectives on the task sub-interface of the second user comprises:

for any second objective of the one or more second objectives, in response to determining that the correlation between at least one second sub-objective comprised in the second objective and the first sub-objective is greater than the preset correlation threshold, displaying the second objective and the at least one second sub-objective with the correlation greater than the correlation threshold.

8. The information processing method according to claim 1, wherein the obtaining at least one second task information entry of the second user comprises:

obtaining an identifier of the second user and an identifier of the first task information entry from attribute information of the user control; and obtaining the at least one second task information entry of the second user from a task management server based on the identifier of the second user and the identifier of the first task information entry.

9. The information processing method according to claim 8, further comprising:

acquiring the correlation between the at least one second task information entry and the first task information entry.

10. An information processing method, comprising:

receiving a task information acquisition request from a first user client, wherein an identifier of a second user and an identifier of a first task information entry are carried in the task information acquisition request;

extracting at least one second task information entry of the second user from a data storage system based on the identifier of the second user;

determining a correlation between the at least one second task information entry and the first task information entry based on the identifier of the first task information entry; and returning the at least one second task information entry and the correlation between the at least one second task information entry and the first task information entry to the first user client, and displaying a task sub-interface of the second user on a task interface on a display of the first user, wherein:

the first task information entry comprises a first objective and a plurality of first sub-objectives comprised in the first objective, the at least one second task information entry comprises a second objective associated with the first objective and a plurality of second sub-objectives comprised in the second objective, and the first user client is configured for comparing a correlation between the plurality of second sub-objectives and the first sub-objective associated with the second user with a preset correlation threshold, and displaying, one by one, one or more second objectives and one or more second sub-objectives on the task sub-interface of the second user, wherein the one or more second objectives comprise the one or more second sub-objectives and one or more correlations between the one or more second sub-objectives and the first sub-objective associated with the second user are greater than the preset correlation threshold, displaying an unfold control and a first prompt, wherein the first prompt is configured for indicating part of second sub-objectives are hidden, and displaying all the second sub-objectives and second objectives in response to a triggering option on the unfold control, wherein each correlation is determined via a machine learning model;

displaying a fold control on the task sub-interface of the second user, and displaying the second task information entries with the correlation greater than the preset correlation threshold on the task sub-interface of the second user in response to a preset operation on the fold control.

11. The information processing method according to claim 10, wherein the extracting at least one second task information entry of the second user from a data storage system based on the identifier of the second user comprises:

extracting, from the data storage system, the at least one second task information entry associated with the first task information entry among task information entries of the second user, based on the identifier of the second user and the identifier of the first task information entry; or extracting all task information entries of the second user from the data storage system based on the identifier of the second user, and extracting the at least one second task information entry associated with the first task information entry from all the task information entries based on the identifier of the first task information entry and task association information stored in the data storage system.

12. The information processing method according to claim 10, wherein the determining a correlation between the at least one second task information entry and the first task information entry based on the identifier of the first task information entry comprises:

determining the correlation between the at least one second task information entry and the first task information entry based on a textual similarity algorithm; or determining the correlation between the at least one second task information entry and the first task information entry based on an association parameter set by the second user for the at least one second task information entry and the first task information entry.

13. An electronic device comprising a memory, a processor, and a computer program stored in the memory and executable on the processor, wherein the processor, when executing the computer program, implements the information processing method according to claim 1.

14. A non-transitory computer-readable storage medium storing computer instructions, wherein the computer instructions when executed by a computer, cause the computer to perform the information processing method according to claim 1.

15. An electronic device comprising a memory, a processor, and a computer program stored in the memory and executable on the processor, wherein the processor, when executing the computer program, implements the information processing method according to claim 10.

16. A non-transitory computer-readable storage medium storing computer instructions, wherein the computer instructions when executed by a computer, cause the computer to perform the information processing method according to claim 10.

17. The information processing method according to claim 1, wherein the displaying, one by one, one or more second objectives and one or more second sub-objectives on the task sub-interface of the second user comprises:

for any second objective of the one or more second objectives, in response to determining that the correlation between at least one second sub-objective comprised in the second objective and the first sub-objective is greater than the preset correlation threshold, displaying the second objective and the at least one second sub-objective with the correlation greater than the correlation threshold.

18. The non-transitory computer-readable storage medium according to claim 14, wherein the displaying the at least one second task information entry on the task sub-interface of the second user based on a correlation between the at least one second task information entry and the first task information entry further comprises:

providing a fold control on the task sub-interface of the second user; and in response to a preset operation on the fold control, displaying the second task information entry with the correlation greater than the correlation threshold on the task sub-interface of the second user.

* * * * *